United States Patent [19]
Sawano

[11] Patent Number: 5,903,715
[45] Date of Patent: May 11, 1999

[54] DOT MATRIX PRINTER HAVING REDUCED BIT MAP DATA STORAGE

[75] Inventor: Itsumi Sawano, Nagano, Japan

[73] Assignee: Seiko Epson Corporation, Tokyo, Japan

[21] Appl. No.: 07/985,969

[22] Filed: Dec. 4, 1992

[30] Foreign Application Priority Data

Dec. 6, 1991 [JP] Japan ..................................... 3-349653
Oct. 6, 1992 [JP] Japan ..................................... 4-267545

[51] Int. Cl.⁶ .................................................. G06K 15/00
[52] U.S. Cl. ........................................... 395/114; 395/115
[58] Field of Search ..................................... 395/114, 115, 395/110, 101, 102, 103, 104, 105, 106, 107, 108, 109, 111, 112, 113, 116, 117; 358/296; 400/121

[56] References Cited

U.S. PATENT DOCUMENTS

| | | | |
|---|---|---|---|
| 5,058,187 | 10/1991 | Kim . | |
| 5,150,454 | 9/1992 | Wood et al. | 395/114 |
| 5,207,517 | 5/1993 | Ito | 400/121 |
| 5,208,676 | 5/1993 | Inui | 358/296 |
| 5,272,768 | 12/1993 | Bauman et al. | 395/110 |

FOREIGN PATENT DOCUMENTS

| | | |
|---|---|---|
| 0 029 327 A1 | 5/1981 | European Pat. Off. . |
| 0 436 026 A1 | 7/1991 | European Pat. Off. . |
| 0 448 725 A1 | 10/1991 | European Pat. Off. . |
| 0 503 903 A2 | 9/1992 | European Pat. Off. . |

*Primary Examiner*—Steven P. Sax
*Attorney, Agent, or Firm*—Sughrue, Mion, Zinn, Macpeak & Seas, PLLC

[57] ABSTRACT

A bit map data generator section prepares bit map data on the basis of data received from a host computer. A null-series removal section removes data series of null from the bit map data. A data compressor compresses the remaining bit map data using a plurality of different compression modes. A comparator compares the sizes of the compressed data produced by the different compression modes. Of the compressed data, the compressed data of the smallest size is stored in a RAM by a register section. When the supplemental character data is printed out, the compression mode by which it was compressed is discriminated by a compression mode discriminator. The data is transferred to a compressed-data restoring section corresponding to the discriminated compression mode, and then to a null-series restoring section. The null-series restoring section restores the data into the original bit map data, that is, the bit map data before compression.

17 Claims, 8 Drawing Sheets

DOT MATRIX PRINTER HAVING REDUCED BIT MAP DATA STORAGE

BACKGROUND OF THE INVENTION

The present invention relates to a dot matrix printer which stores bit map data composed of characters and graphics provided by a user, and which reads out the bit map data with code signals received from a host computer. More particularly, the invention relates to a dot matrix printer employing an improved technique for storing and reading out the bit map data.

To print patterns other than the graphics and characters previously stored as character sets in a ROM of a printer, the user must prepare pattern bit map data corresponding to the characters to be printed, and store the prepared patterns as supplemental character data in a memory of the printer.

Usually, a part of a buffer memory, for example, in the printer, is used for storing the supplemental character data. In this case, it is necessary to provide in advance a memory having a capacity sufficient for storing the data of the largest size expected.

The amount of supplemental character data differs among users. Some users require only a small amount of supplemental character data, while others need a large amount of such data. In the former case, a large part of the memory allocated for storing the supplemental character data is not used and is wasted.

A technique for reducing the memory capacity of the memory used for storing the data by compressing the bit map data of the supplemental character data has been used for factory-installed character patterns. However, it is difficult for general users to employ such a method for storing supplemental character data since special knowledge is required for carrying out such a method.

SUMMARY OF THE INVENTION

The present invention has been made in view of the above circumstances, and has as an object the provision of a dot matrix printer which can store supplemental character data prepared by a user after the data has been converted into compressed data without requiring any compressing operation to be performed by the user, and which can effectively utilize the available memory.

To achieve the above and other objects of the invention, as described herein, a dot matrix printer comprises means for compressing bit map data using a plural number of data compressing methods, means for selecting the data compressed by the compressing method providing the smallest amount of compressed data from among the plural items of data compressed by the plural number of compressing methods and which are output from the compressing means, means for storing the compressed data selected by the selecting means, and means for restoring the compressed data read out of the storing means to bit map data.

That is, in accordance with the invention, the bit map data is compressed using a plural number of compressing methods. The amounts of the compressed data resulting from the application of these compressing methods are compared. The compressed data having the smallest size is selected, and then stored in to the storing means. Accordingly, the supplemental character data prepared by the user can automatically be stored in the storing means in the form of compressed data having the smallest size. Accordingly, the memory of the printer can be more effectively utilized.

BRIEF DESCRIPTION OF THE DRAWINGS

The accompanying drawings, which are incorporated in and constitute a part of this specification, illustrate preferred embodiments of the invention, and, together with the following description, serve to explain the objects, advantages and principles of the invention.

DESCRIPTION OF THE PREFERRED EMBODIMENTS

Figure 1:
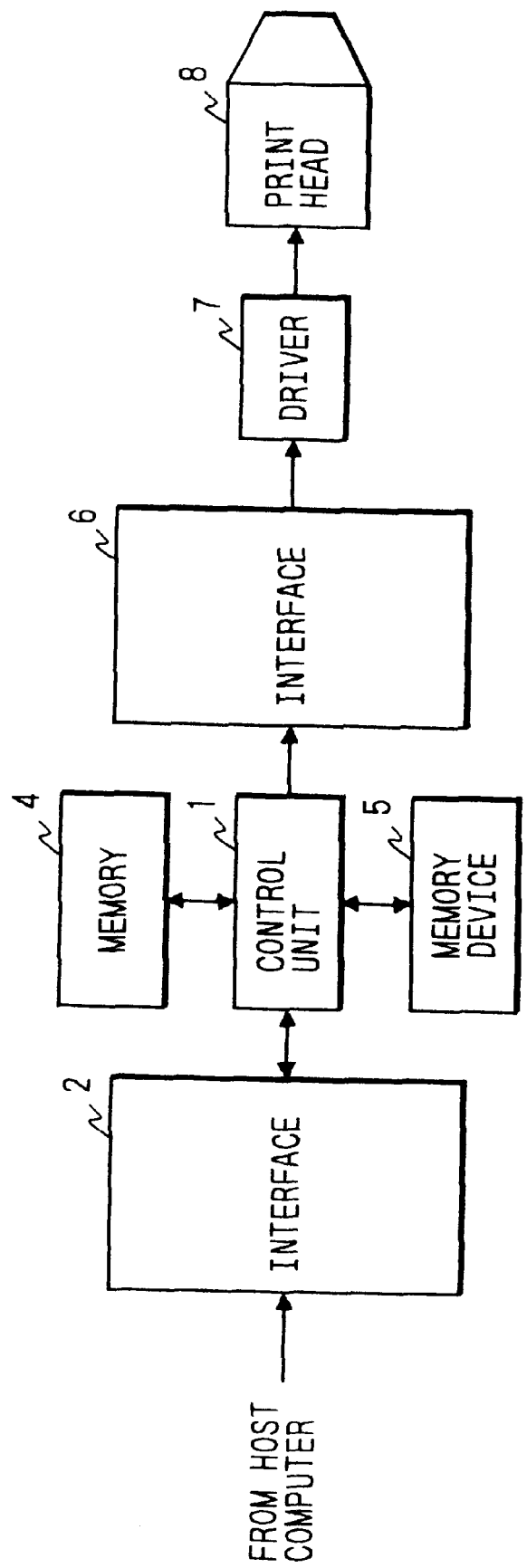
FIG. 1 is a block diagram showing the overall system of a dot matrix printer constructed according to a preferred embodiment of the present invention.

FIG. 1 is a block diagram showing the overall system of a dot matrix printer constructed according to a preferred embodiment of the present invention.

In the figure, reference numeral 1 designates a control unit composed mainly of a microcomputer, which receives signals, such as supplemental character data and control commands, from a host computer by way of an interface 2. The control unit 1 is connected to a memory 4 for storing control programs to control the printer functions and a memory device 5 including a ROM for storing bit map data of characters and patterns as defaults and a work RAM. The control unit 1 is further connected to a driver 7 for transferring bit map data through another interface 6 to a print head 8.

Figure 2:
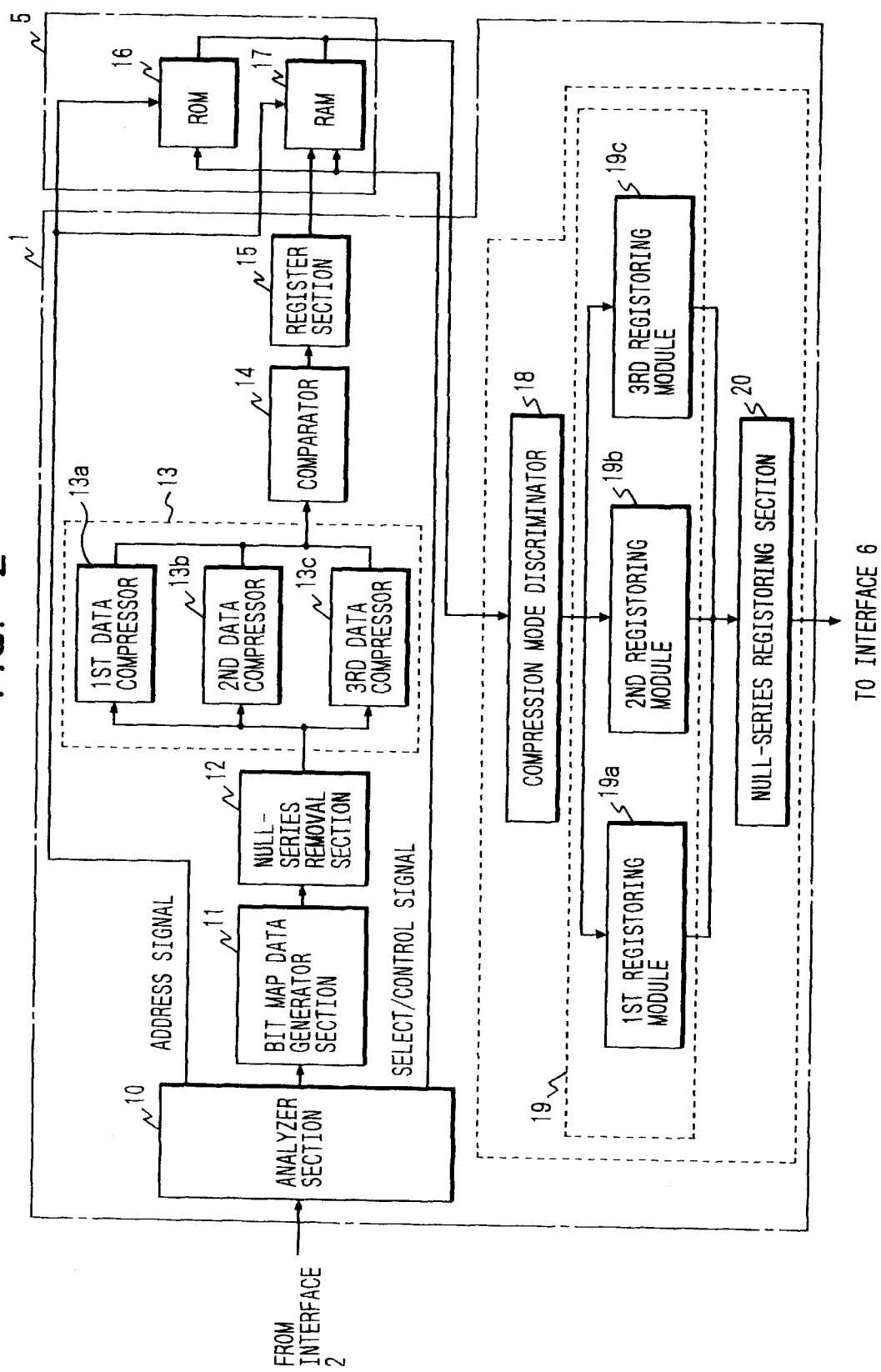
FIG. 2 is a block diagram showing the functions of a microcomputer used in the printer of FIG. 1.

FIG. 2 is a block diagram showing the functions of a microcomputer of the control unit 1 shown in FIG. 1. A data analyzer section 10 analyzes signals received from the host computer to produce supplemental character data, address signals for the memory, memory select signals and control signals.

The address signal output from the data analyzer section 10 is applied to a RAM 17 and a ROM 16 in which fonts as defaults are previously stored for addressing them. The select signal and control signal from the data analyzer section 10 are applied to the ROM 16 and the RAM 17 for selecting the RAM 17 or the ROM 16 and for controlling the read/write operation of the selected one. The supplemental character data from the data analyzer section 10 is input to a bit map data generator section 11. The bit map data generator section 11, which contains a buffer memory, generates bit map data of the supplemental character data, and assembles a map of the bit map data in an X-Y coordinate area of the buffer memory. The bit map data mapped in the buffer memory of the bit map data generator section 11 is read therefrom by a null-series removal section 12. The null-series removal section 12 checks whether or not, of the bit map data (of FIG. 4, or example), grouped data (referred to as data series) arrayed serially and in the direction (vertical direction in FIG. 4) of arraying dot forming elements (e.g., print pins) of a print head 8 are all the data (referred to as null data) not forming dots (viz., which is null). If data series (referred to as null data) consisting of only null data is present, the null-series removal section 12 removes the data (this removal process is called a pre-compression process).

The pre-compressed bit map data output from the null-series removal section 12 is input to a data compressor 13 operable in plural types of data compression modes. The data compressor 13 compresses the pre-compressed bit map data in the respective compression modes. The bit map data (compressed data) compressed in the compression modes, together with the pre-compressed bit map data not yet compressed (referred to uncompressed data), is transferred to a comparator 14. The comparator compares the amounts of the compressed data and the uncompressed data, and selects the compressed data or uncompressed data having the smallest size. The selected data is transferred to a register section 15. Then, the data, together with information data attached thereto, such as half information, left-space information, right-space information, and compression mode information (as will be discussed in detail later) is stored into the RAM 17.

The data read out of the ROM 16 or the RAM 17 is transferred to a compression mode discriminator 18. The compression mode discriminator 18 discriminates the data compression mode by which the compressed data was compressed, determines whether or not the data is compressed, and transfers the read-out data to one of restoring modules 19a to 19d of a compressed-data restoring section 19 in accordance with the result of the compression-mode discrimination. The compressed-data restoring section 19 restores the compressed data from the RAM 17 to the pre-compressed bit map data using the attendant data of the half information, left-space information, right-space information, and compression mode information. The bit map data from the compressed-data restoring section 19 is input to a null-series restoring section 20, which in turn adds the null series, which was removed by the null-series removal section 12, to the bit map data. As a result, the compressed data is restored to the original bit map data. The original bit map data is transferred through the interface 6 to the print head where it is printed out.

In the dot matrix printer thus constructed, when receiving a supplemental-character-data request from the host s computer, the data analyzer section 10 acknowledges the request and then enables the RAM 17 by a select signal. The supplemental character data from the host computer is compressed by the best data compression mode as stated above, and transferred as compressed data to the RAM 17. At the same time, the RAM 17 is addressed by an address signal. The data is written into the memory location of the specified address in the RAM under the control signal. In this way, the compressed supplemental character data attendant with the information data is registered in the RAM 17. Details of the processing of the supplemental character data will be described hereinafter.

The bit map data generator section 11 converts the supplemental character data received from the host computer into bit map data representative of a dot pattern. Subsequently, the bit map data is transferred to the null-series removal section 12 where the null series is removed from the data (i.e., the data is pre-compressed).

The pre-compression is carried out as follows. The number of successive null series is counted from the left end of the bit map data. The counted number of the null series is treated as left-side null data. The null series present successively from the left end of the bit map data are removed in the counted number. Then, as for half information, the null-series removal section checks whether or not the null series are present every second data series in the remaining bit map data. If the null series are absent, the null-series removal section turns off the half-dot present flag. If those are present every second data series, the null-series removal section turns on the half-dot present flag, and counts the number of successive null series from the right end of the bit map data treating the counted number of the null series as right null information, and removes the counted number of the null series present successively from the right end of the bit map data. When the half-dot present flag is in an ON state, for instance, the null series are removed. When the half-dot present flag is in an OFF state, no further removal of null series is carried out. After the completion of the pre-compression process, the number of bytes of bit map data is counted.

Subsequently, the pre-compressed bit map data is transferred to the data compressor 13 where it is further compressed. In this embodiment, three data compression modes are employed, which operate in the following ways.

A first data compressor (first compression mode) 13a checks whether or not the pattern of the whole pre-compressed bit map data is symmetrical with respect to the vertical center line. If it is symmetrical, the data is divided, with respect to the center line, into two portions, right and left data. Only one of the right and left data is employed.

Figure 4:
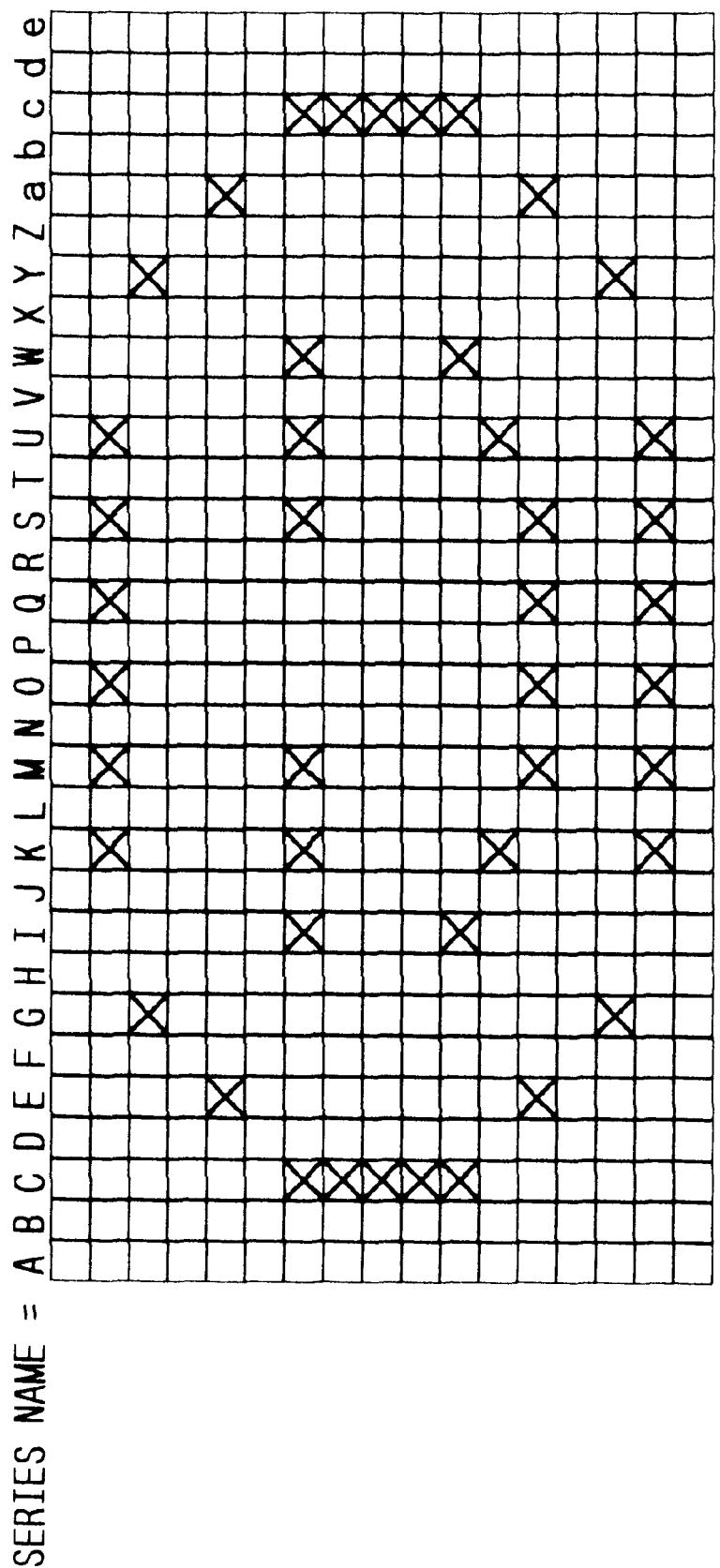
FIG. 4 is a diagram showing an example of bit map data, which is used for explaining the operation of the printer.

A second data compressor (second compression mode) 13b calculates the exclusive-OR logical sum of the right and left data bytes adjacent to each other (the data byte means the data group forming one byte in the data series; in the case of FIG. 4, the upper half and the lower half of the data series are respectively the data bytes) to check whether or not the data bytes are equal to each other. If the adjacent data bytes are the same, one (e.g., the right data) of the data bytes is removed. If the two byte data are different, both byte data are left.

A third data compressor (third compression mode) 13c checks whether data byte (referred to as null byte) consisting of only null data is present or absent. In this compression mode, the symmetry and the equality of the adjacent data bytes are not checked. If the null byte is present, the third compressor removes the null byte and leaves the remaining bytes.

The sizes (data amounts) of the data thus compressed in the respective compression modes are calculated. The sizes of the three compressed data, as well as the size of the uncompressed data, are compared by the comparator 14. Of these compression modes, the compression mode providing the smallest data size is determined to be the best data compression mode. The compressed data having undergone the best compression mode, together with the attendant data, such as half information, left-null information, right-null information, and compression mode information, is transferred to the register section 15 and then stored into the RAM 17.

Figures 3, 6:
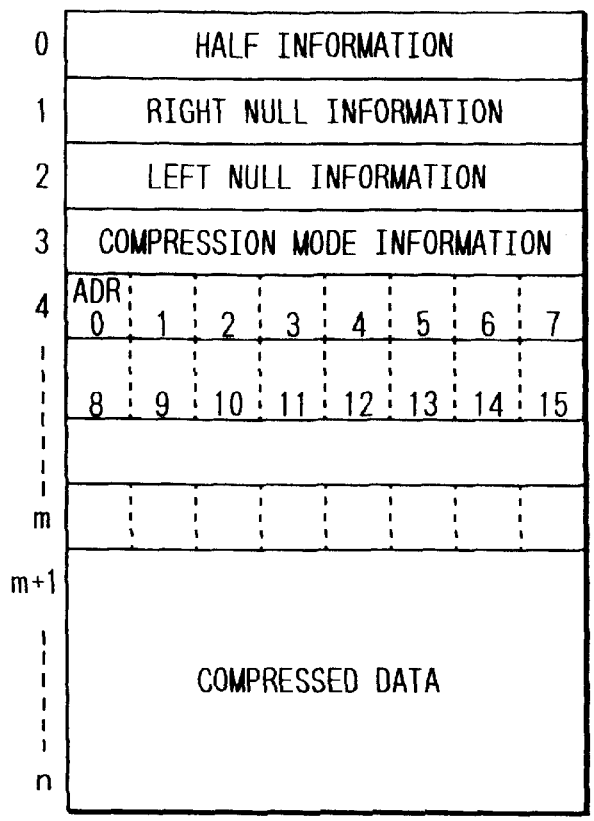
FIG. 3 is a diagram showing the structure of a memory area assigned to one supplemental character in a RAM.
FIG. 6 is a diagram showing the bit map data after pre-compression.

FIG. 3 is a diagram showing the structure of a memory area assigned to one supplemental character in a RAM. As shown, half information data is stored in a subaddress 0, left-null information data in the subaddress 1, right-null information data in the subaddress 2, and compression mode information data in the subaddress 3. Removal byte information is stored in the subaddresses 4 to m. The removal byte information indicates the addresses of the data byte removed by the best compression mode. The bits in this memory area correspond to the byte addresses in the bit map data. Data "1" is stored in the bits of the addresses of the removed byte data. The remaining memory area from the subaddresses (m+1) to n store the compressed data.

To print the supplemental characters registered in such an order, the data analyzer section 10, which receives a supplemental-character print request from the host computer, sends select, address, and control signals to the RAM 17. The compressed data of the supplemental characters, and the attached data of half information, left-null information, right-null information, and compression mode information, are read out of the RAM 17, and transferred to the compression mode discriminator 18. Upon receipt of the information data, the compression mode discriminator 18 transfers the supplemental character data to the restoring module which corresponds to the best compression mode. Specifically, when the data is compressed by the first compression mode, the compression mode discriminator 18 transfers the data to the first restoring module 19a. When the data is compressed by the second compression mode, the data is transferred to the second restoring module 19b, and so on. The data, after being restored by the compressed-data restoring section 19, is transferred to the null-series restoring section 20. In the null-series restoring section 20, the null series are restored on the basis of the attendant data of half information, left-null information, right-null information, and compression mode information. The original bit map data thus restored is sent to the printer for printing out the bit map data.

A specific operation of the dot matrix printer as stated above will be described using an example of the bit map data shown in FIG. 4.

Figure 5:
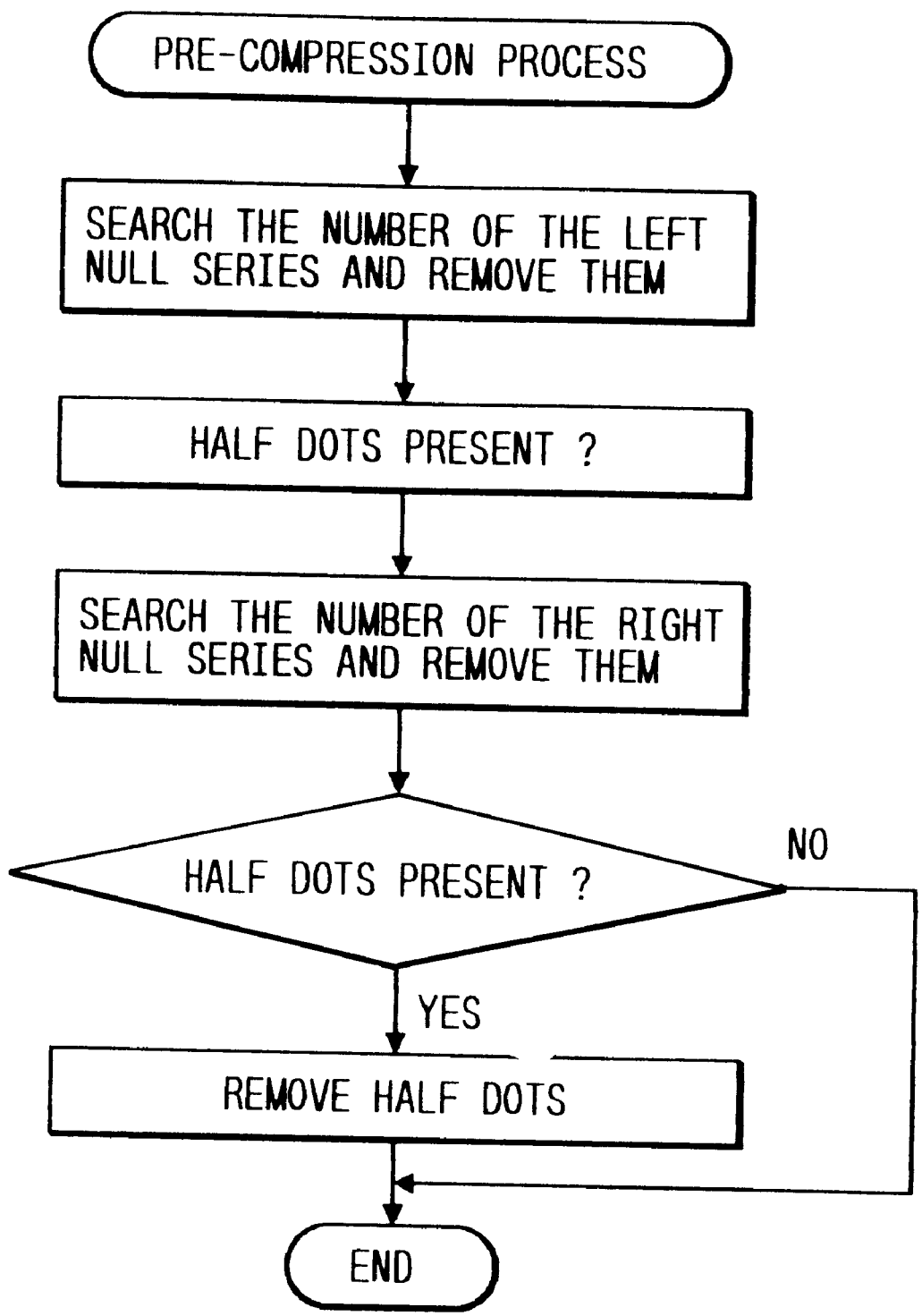
FIG. 5 is a flow chart showing a sequence of procedural steps for a pre-compression process employed in the printer.

An operation flow of the process (pre-compression process) of removing the null series, which precedes the compression process, is shown in FIG. 5. The null-series removal section checks the number of right null series. In this instance, data series A and b are the left null series. Accordingly, 2 as the number of null series is registered as the left null information, and these null series are removed. Then, the null-series removal section checks the remaining bit map data successively from the right side to the left side to determine whether or not the null series is present every second data series. In this instance, the null series "d", "b", . . . , "F", and "D" are present every second data series, so that the half-dot present flag is turned on. Then, the null series "e" and "d" are detected, and these two null series are registered as right null information and removed. Since the half-dot present flag is in an ON state, the null series are removed every other data series. In this way all the null series are removed, so that bit map data as shown in FIG. 6 is obtained. In this bit map data, half of one data series corresponds to one byte. Accordingly, the data amount of the bit map data is 28 bytes. Even-numbered byte addresses are assigned to the upper data byte, and odd-numbered byte addresses are assigned to the lower data byte.

Figure 7:
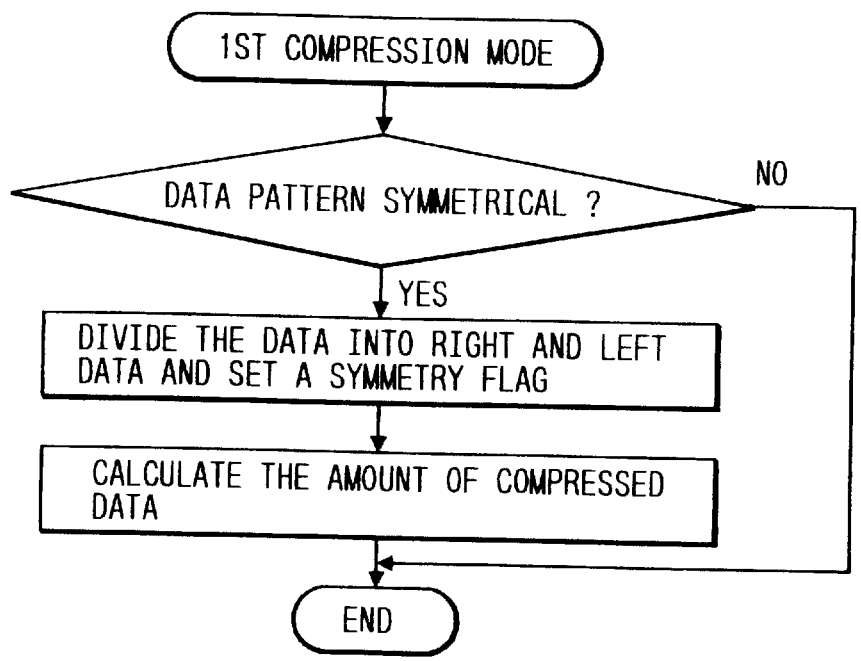
FIG. 7 is a flow chart showing a sequence of procedural steps of the data compression process carried out in a first compression mode in the printer.
Figure 8:
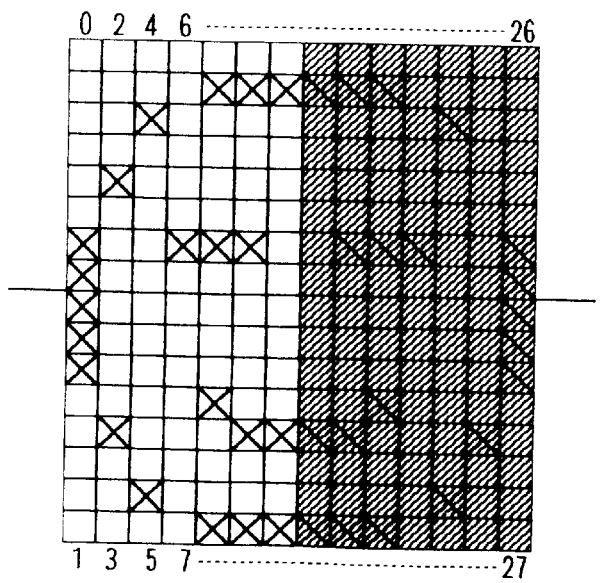
FIG. 8 is a diagram showing, the state of the data compression achieved by the first compression mode.

Subsequently, the data of FIG. 6 is compressed by the data compressor 13. Firstly, the first compression mode will be described. The operational flow of the first compression mode is shown in FIG. 7. The state of data compression is shown in FIG. 8. The first compressor checks the overall pattern of the bit map data to determine whether or not the pattern is symmetrical with respect to the center line. If it is symmetrical, the bit map data is divided into right and left data, and a symmetrical flag indicating the symmetry of the pattern is set. One (e.g., left data) of the right and left data is selected, and the amount of data is calculated. If it is asymmetrical, this compression mode does not compress the data. A shaded portion in FIG. 8 indicates the data byte to be removed by the compression process. In this instance, since the amount of the data before compression is 28 bytes, the amount of data after compression is half of the former, i.e., 14 bytes.

Figure 9:
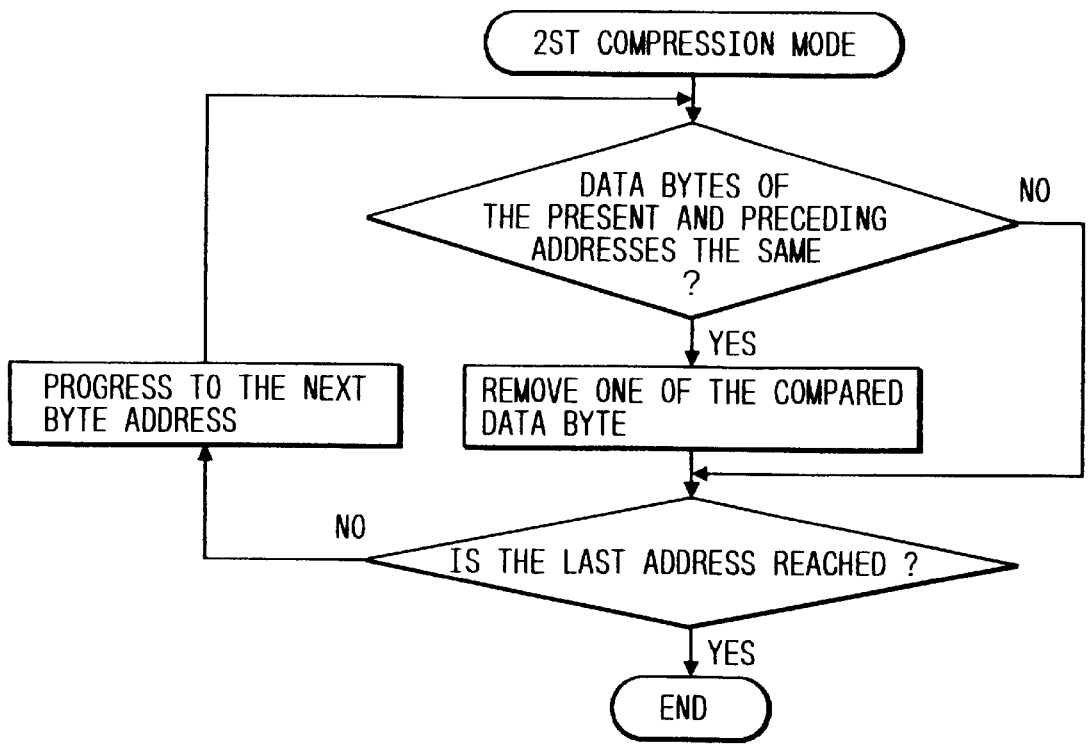
FIG. 9 is a flow chart showing a sequence of procedural steps of the data compression process carried out in a second compression mode.
Figure 10:
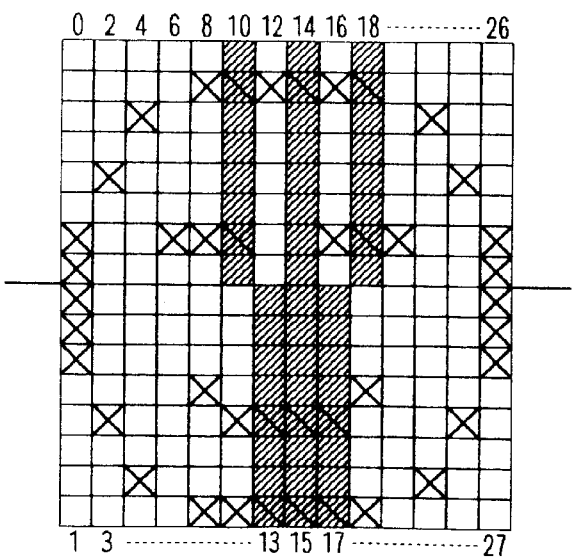
FIG. 10 is a diagram showing the state of the data compression achieved by the second compression mode.

The second compression mode will be described. The operational flow of the second compression mode is illustrated in FIG. 9. The state of data compression by the second compression mode is shown in FIG. 10. The second data compressor compares the right and left data bytes to check whether or not those data bytes are equal to each other. If those data bytes are equal, one of the data bytes is removed. If those data bytes are not equal, the second compressor advances to the next data series and compares new adjacent data bytes. A comparison is made of all pairs of adjacent data bytes. In this example, when checking the data from the left side, the bytes at the addresses 0, 2, 4, 6, and 8 are not equal, and hence are left as they are. The data bytes at the addresses 8 and 10 are equal, so that the data byte at the address 10 is removed. The data bytes at the addresses 8 and 12 are not equal, and thus are left as they are. Then, the data bytes at the addresses 12 and 14 are compared. These bytes are equal, so that the bytes at the address 14 is removed. The comparing process progresses until finally the bytes hatched in FIG. 10 are removed. In this instance, the amount of the original data is reduced by 6 bytes, so that the amount of the compressed data is 22 bytes.

Figure 11:
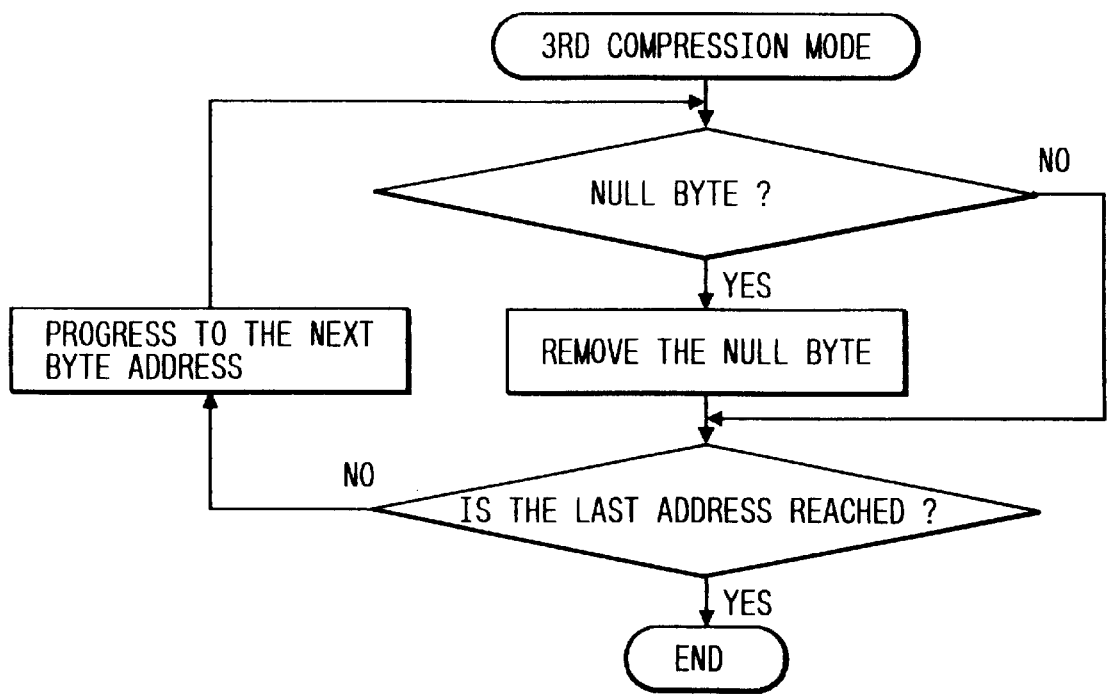
FIG. 11 is a flow chart showing a sequence of procedural steps of the data compression process carried out in a third compression mode.
Figure 12:
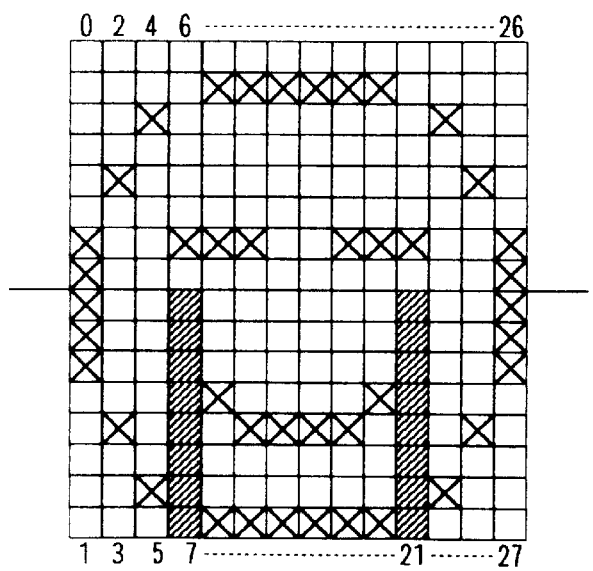
FIG. 12 is a diagram showing the state of the data compression achieved by the third compression mode.

The third compression mode will be described. As seen from the flow chart of FIG. 11, when the bits of the data byte are all null spaces, this compression mode removes the space bytes. The removal process is applied to all data bytes. In this instance, the bytes of which the bits are all null are only the bytes at the addresses 7 and 21, which are thus removed. Since the amount of the data before compression is thus reduced by two bytes, the amount of the data after compression is 26 bytes.

When comparing the amounts of the data after compression by the first to third compression modes, it is seen that the data amount achieved by the first compression mode is the smallest. Accordingly, the data compressed by the third compression mode is registered in the RAM 17.

In the above-mentioned embodiment, the best compressing method is selected from among the three described compressing methods. It is evident though that other compressing methods may be used for the present invention. For example, the patterns of the data bytes separated by one byte from each other may be compared for checking whether or not these patterns are equal. Where three or more of the same pattern successively recur, the first byte and the number of bytes having the same patterns as that of the first byte may be registered as the compressed data.

As seen from the foregoing description, in the present invention, the supplemental character data is automatically compressed and registered in the memory, which is similar to the normal procedure for preparing supplemental characters. Therefore, the memory capacity can be effectively used.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment described was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A dot matrix printer comprising:
   a plurality of data compressors for compressing bit map data each by a different data compressing method and outputting respective compressed data outputs;
   a data selector for selecting from among the compressed data outputs the one output which yields a smallest amount of compressed data;
   a memory for storing the selected compressed data output selected by said data selector; and
   a data restorer for restoring the stored compressed data output to the bit map data.

2. The dot matrix printer according to claim 1, further comprising a bit map data generator for generating the bit map data using pattern data of character/graphic patterns received from an external device, and applying the generated bit map data to said data compressors.

3. The dot matrix printer according to claim 1, further comprising a pre-compressor for removing null data satisfying predetermined conditions from original bit map data, to produce the bit map data, and for outputting the bit map data to said plurality of data compressors.

4. The dot matrix printer according to claim 1, wherein said memory stores the selected output together with compressing-method information indicative of the one of said plural data compressors producing the selected output and removed-data information indicative of positions of data deleted by said one data compressor.

5. The dot matrix printer according to claim 4, wherein said data restorer comprises a plurality of data restoring modules corresponding respectively to said plurality of data compressors, said data restorer selecting the one of said restoring modules corresponding to said one data compressor on the basis of the compressing method information stored in said storing means.

6. The dot matrix printer according to claim 5, wherein said data restorer restores the deleted data on the basis of the removed-data information stored in said storing means.

7. A method for storing and retrieving bit map data in a dot matrix printer, comprising the steps of:
   compressing the bit map data by a plural number of different data compressing methods;
   selecting the data compressed by the compressing method which provides a smallest amount of compressed data;
   storing the selected compressed data; and
   reading out the stored compressed data and restoring the read out compressed data to the bit map data.

8. The method according to claim 7, further comprising, prior to said step of compressing, a step of generating the bit map data from pattern data of character/graphic patterns received from an external device.

9. The method according to claim 7, further comprising, prior to said step of compressing, a step of pre-compressing the bit map data by removing null data satisfying predetermined conditions from the bit map data.

10. The method according to claim 7, wherein said step of storing comprises storing the selected compressed data together with compressing-method information indicative of the compressing method producing the selected compressed data and removed-data information indicative of positions of data deleted in said step of compressing.

11. The method according to claim 7, wherein, in said step of compressing, one of said plural number of data compressing methods comprises the steps of:
   checking whether or not the bit map data is symmetrical with respect to a vertical center line thereof;
   if the bit map data is symmetrical, dividing the bit map data with respect to said center line into right and left data; and
   providing only one of the right and left data for said selecting step.

12. The method according to claim 7, wherein, in said step of compressing, one of said plural number of data compressing methods comprises the steps of:
   calculating an exclusive-OR logical sum of right and left data bytes adjacent to each other in the bit map data to check whether or not the data bytes are equal to each other;
   if the adjacent data bytes are equal to each other, removing one of the adjacent data bytes while providing the other adjacent data byte; and
   if the adjacent data bytes are different, providing both adjacent data bytes.

13. The method according to claim 7, wherein, in said step of compressing, one of said plural number of data compressing methods comprises the steps of:
   checking whether data bytes consisting of only null data are present or absent; and
   removing any of the data bytes consisting of only null data.

14. The method according to claim 7, further comprising, prior to said step of compressing, pre-compressing input data to provide the bit map data by steps comprising:
   counting a number of successive null series from a left end of the input data and treating the counted number as left-side null data;
   successively removing the counted number of the null series present from the left end of the input data, to provide remaining data;
   checking whether or not null series are present every second data series in the remaining data;
   if the null series are absent in the remaining data, setting a half-dot present flag in an OFF state, and if the null series are present in any of the every second data series, setting the half-dot present flag in an ON state;
   counting a number of successive null series from a right end of the input data and treating the counted number as right null information;
   successively removing the counted number of the null series present from the right end of the input data;
   when said half-dot present flag is in said ON state, removing the null series present in any of the every second data series.

15. The method according to claim 11, wherein the bit map data checked in said checking step is pre-compressed bit map data.

16. The method according to claim 12, wherein the bit map data checked in said calculating step is pre-compressed bit map data.

17. The method according to claim 13, wherein the data bytes checked in said checking step are pre-compressed bit map data bytes.

* * * * *